(12) United States Patent
Ando et al.

(10) Patent No.: US 10,120,507 B2
(45) Date of Patent: Nov. 6, 2018

(54) TOUCH TYPE INPUT DEVICE

(71) Applicant: Murata Manufacturing Co., Ltd., Nagaokakyo-shi, Kyoto-fu (JP)

(72) Inventors: Masamichi Ando, Nagaokakyo (JP); Hidekazu Kano, Nagaokakyo (JP); Hiroaki Kitada, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/751,428

(22) Filed: Jun. 26, 2015

(65) Prior Publication Data

US 2015/0301657 A1 Oct. 22, 2015

Related U.S. Application Data

(63) Continuation of application No. PCT/JP2014/075354, filed on Sep. 25, 2014.

(30) Foreign Application Priority Data

Sep. 27, 2013 (JP) ................... 2013-202197

(51) Int. Cl.
*G06F 3/044* (2006.01)
*G06F 3/041* (2006.01)
(Continued)

(52) U.S. Cl.
CPC ............ *G06F 3/044* (2013.01); *G06F 3/0414* (2013.01); *G06F 3/0416* (2013.01);
(Continued)

(58) Field of Classification Search
CPC ...... G06F 3/0414; G06F 3/0416; G06F 3/044; G06F 3/0485; G06F 3/0488;
(Continued)

(56) References Cited

U.S. PATENT DOCUMENTS 9,244,562 B1* 1/2016 Rosenberg .......... G06F 3/04847
2006/0279548 A1* 12/2006 Geaghan ............... G06F 3/0416
345/173

(Continued)

FOREIGN PATENT DOCUMENTS

CN 101320303 A 12/2008
EP 2 624 107 A2 8/2013
(Continued)

OTHER PUBLICATIONS

International Search Report issued for PCT/JP2014/075354, dated Dec. 22, 2014.
(Continued)

*Primary Examiner* — Stacy Khoo
(74) *Attorney, Agent, or Firm* — Arent Fox LLP

(57) ABSTRACT

When determining that a level of a deformation detection signal is greater than a threshold, a controller assumes that a touch operation is performed at an initially-detected position and virtually at another position different from the position, and outputs a position detection signal to a processor indicating that the two touch positions and separate from each other based on the touch position. Thus, the controller converts the deformation detection signal into the position detection signal corresponding to a pinch-out operation, and outputs the position detection signal to the processor.

25 Claims, 17 Drawing Sheets

(51) Int. Cl.
*G06F 3/0488* (2013.01)
*G06F 3/0485* (2013.01)

(52) U.S. Cl.
CPC .......... *G06F 3/0485* (2013.01); *G06F 3/0488* (2013.01); *G06F 2203/04102* (2013.01); *G06F 2203/04105* (2013.01); *G06F 2203/04106* (2013.01); *G06F 2203/04806* (2013.01); *G06F 2203/04808* (2013.01)

(58) Field of Classification Search
CPC . G06F 2203/04102; G06F 2203/04105; G06F 2203/04106; G06F 2203/04806; G06F 2203/04808
USPC ..................... 345/173–179; 178/18.01–18.09
See application file for complete search history.

(56) References Cited

U.S. PATENT DOCUMENTS

| | | | | |
|---|---|---|---|---|
| 2008/0303799 | A1* | 12/2008 | Schwesig | G06F 3/0414 345/173 |
| 2008/0309632 | A1* | 12/2008 | Westerman | G06F 3/038 345/173 |
| 2010/0277432 | A1* | 11/2010 | Tsai | G06F 3/0414 345/174 |
| 2011/0167391 | A1* | 7/2011 | Momeyer | G06F 1/1684 715/863 |
| 2012/0007832 | A1* | 1/2012 | Lee | G06F 3/03547 345/174 |
| 2012/0025674 | A1* | 2/2012 | Yoshida | C08G 63/08 310/365 |
| 2012/0147052 | A1 | 6/2012 | Homma et al. | |
| 2012/0260220 | A1* | 10/2012 | Griffin | G06F 3/033 715/863 |
| 2013/0033717 | A1* | 2/2013 | Matsumoto | G06F 3/0483 358/1.13 |
| 2013/0234960 | A1* | 9/2013 | Yamamoto | G06F 3/04883 345/173 |
| 2014/0152618 | A1 | 6/2014 | Ando | |
| 2014/0347304 | A1 | 11/2014 | Ando | |

FOREIGN PATENT DOCUMENTS

| | | |
|---|---|---|
| JP | S63-219030 A | 9/1988 |
| JP | H05-61592 A | 3/1993 |
| JP | 2011-053974 A | 3/2011 |
| WO | WO 2013/021835 A1 | 3/2015 |
| WO | WO 2013/122070 A1 | 5/2015 |

OTHER PUBLICATIONS

Written Opinion of the International Search Authority issued for PCT/JP2014/075354, dated Dec. 22, 2014.

\* cited by examiner

TOUCH TYPE INPUT DEVICE

CROSS REFERENCE TO RELATED APPLICATIONS

The present application is a continuation of PCT/JP2014/075354 filed Sep. 25, 2014, which claims priority to Japanese Patent Application No. 2013-202197, filed Sep. 27, 2013, the entire contents of each of which are incorporated herein by reference.

FIELD OF THE INVENTION

The present invention relates to a touch type input device that detects a touch operation of a user.

BACKGROUND OF THE INVENTION

Nowadays, a touch type input device provided with an electrostatic capacitance sensor is in widespread use in order to detect the touch operation of the user. The touch type input device assumes that the touch operation is performed when a detection capacitance of the electrostatic capacitance sensor is greater than a predetermined threshold, detects a position where the touch operation is performed, and outputs a position detection signal indicating the detected position.

There has also been proposed a touch type input device that can detect a pressing operation performed on a touch panel while detecting a position where the touch operation is performed (for example, see Patent documents 1 and 2).

There has also been proposed a touch type input device that can detect a bending operation and a twisting operation (for example, see Patent document 3).

Patent document 1: International Publication No. 2013/21835.

Patent document 2: Unexamined Japanese Patent Publication No. 5-61592.

Patent document 3: International Publication No. 2013/122070.

The position detection signal of the touch type input device is received by a predetermined host device, and used in application software executed by the host device. However, sometimes an operating system (hereinafter, abbreviated to OS) installed in the host device deals only with processing for the position detection signal of the electrostatic capacitance sensor. In this case, the OS cannot receive signals (hereinafter, referred to as a deformation detection signal) corresponding to the pressing operation, bending operation, and twisting operation. For example, the host device on which Windows (registered trademark) is installed as the OS can receive only the position detection signal from the touch type input device, but cannot receive the deformation detection signal.

In order to receive the deformation detection signal, it is conceivable that special software (driver) that can receive and process the deformation detection signal is added to the host device on which the OS is installed. However, a large amount of time and expense is needed to develop the special driver. In some OSs, the addition of the special driver is prohibited. In the host device on which the OS in which the addition of the special driver is prohibited is installed, the deformation detection signal cannot be received.

SUMMARY OF THE INVENTION

An object of the present invention is to provide a touch type input device that enables the host device to receive deformation detection signals.

A touch type input device of the present invention includes: an operation surface; and a touch sensor that detects a touch operation performed on the operation surface and a position where the touch operation is performed, and outputs a position detection signal corresponding to the detected position. The touch type input device includes: a deformation detection sensor that detects a deformation operation performed on the touch type input device; and a controller that converts a deformation detection signal corresponding to the deformation operation detected by the deformation detection sensor into the position detection signal, and outputs the position detection signal.

Accordingly, in the touch type input device of the present invention, the deformation detection signal is converted into the position detection signal, so that the host device that can receive only the position detection signal is enabled to receive the deformation detection signal. For example, in the host device that executes the application software that implements shooting of an image in receiving the touch operation, when the deformation detection signal of the bending operation is converted into the position detection signal of the touch operation to output the position detection signal, an instruction to shoot the image can be issued by the bending operation even if the host device cannot receive the deformation detection signal of the bending operation.

In the touch type input device, the controller may convert the deformation detection signal into a position detection signal corresponding to an operation to change a touch position, and output the position detection signal.

For example, in the host device that performs the processing of changing a display image when receiving a swipe operation in which a user transversely moves a finger while performing the touch operation on the touch panel, when the deformation detection signal of the twisting operation is converted into the position detection signal of the swipe operation to output the position detection signal, the processing of changing the image can be performed by the twisting operation even if the host device cannot receive the deformation detection signal of the twisting operation. For example, in the case that the image is changed in the host device such as a tablet PC in which a chassis is held by both hands, it is necessary to temporarily disengage one of both the hands from the chassis to perform the swipe operation with a finger. In contrast, when the touch type input device of the present invention is applied, the user can perform the twisting operation while holding the chassis by both the hands, which allows the user to change the image.

In the touch type input device, the controller may convert the deformation detection signal into a position detection signal corresponding to a pinch operation, which is of an operation to change a distance between a plurality of touch positions, and output the position detection signal.

For example, in the host device that performs the processing of enlarging or reducing the image by a pinch operation, when the deformation detection signal of the pressing operation is converted into the position detection signal of the pinch operation to output the position detection signal, the processing of enlarging or reducing the image can be performed by the pressing operation even if the host device cannot receive the deformation detection signal of the pressing operation. For example, in the case that the host device is a conventional smartphone, it is necessary for the user to perform the pinch operation by one of hands while holding the chassis by the other hand, and the user hardly performs the pinch operation while holding the chassis by one of hands. On the other hand, in the touch type input device of the present invention, the pressing operation is converted into the pinch operation, so that the user can perform the same operation as the pinch operation only by performing the pressing operation with a thumb of the hand holding the chassis.

In the touch type input device, when the touch sensor outputs the position detection signal corresponding to a touch position changing operation after the deformation detection signal is detected, the controller may convert the deformation detection signal into the position detection signal corresponding to a pinch operation, which is of an operation to change a distance between a plurality of touch positions, and output the position detection signal.

In this case, when the user moves the finger in a predetermined direction while performing the pressing operation, the enlarging or reducing processing is performed. For example, when the position detection signal of a pinch-out operation is output in the case that the operation in which the finger is moved upward while the pressing operation is performed is detected, and when the position detection signal of a pinch-in operation is output in the case that the operation to move the finger downward is detected, the user can issue the enlarging instruction when the user moves the finger upward while performing the pressing operation, and the user can issue the reducing instruction when the user moves the finger downward while performing the pressing operation.

In the touch type input device, the deformation detection sensor may further detect a deformation amount, and the controller may control a change amount of the distance in the pinch operation according to the deformation amount detected by the deformation detection sensor, or the controller may control a change amount of the distance in the pinch operation according to the length of detection time of the deformation detection signal.

The deformation detection sensor may detect the deformation operation performed on the operation surface, or the deformation operation performed on the chassis.

Preferably the deformation detection sensor includes a piezoelectric film made of a chiral polymer. The high-transparency pressure sensor can be made when the deformation detection sensor includes the piezoelectric film made of the chiral polymer. More preferably the chiral polymer is polylactic acid. In polylactic acid, the piezoelectricity is generated by a molecule orientation process such as the stretching, but it is not necessary to perform a polarization process unlike other polymers such as PVDF and other piezoelectric ceramics. Because polylactic acid has no pyroelectricity, the deformation detection sensor can be arranged close to the operation surface.

Accordingly, in the present invention, the touch type input device enables the host device, which cannot receive the deformation detection signal, to receive the deformation detection signal.

DETAILED DESCRIPTION OF THE INVENTION

A display device including a touch type input device according to the present invention will be described below with reference to the drawings.

Figure 1:
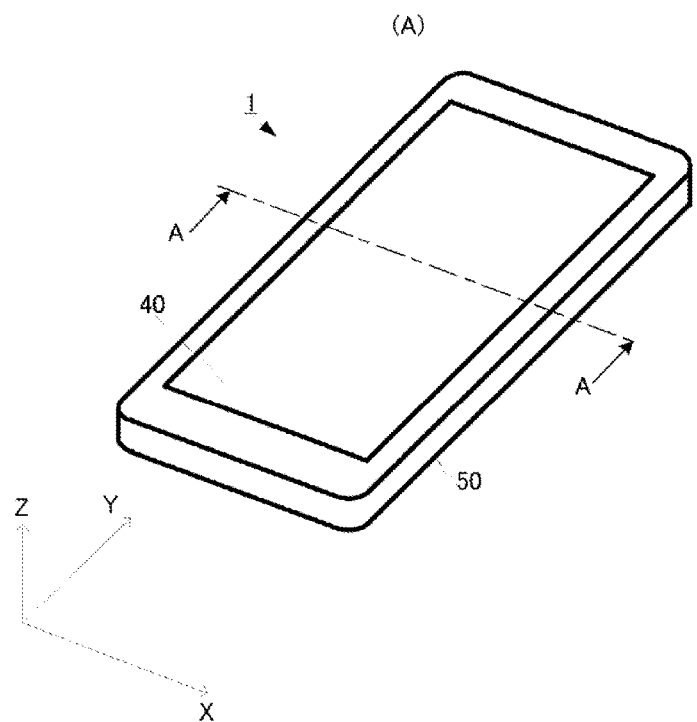
FIG. 1 is a perspective view illustrating an appearance of a display device.

As illustrated in FIG. 1, a display device 1 includes, in appearance, a rectangular-solid chassis 50 and a flat panel 40 that is arranged in an opening on a top surface of the chassis 50. The panel 40 acts as an operation surface on which a user performs a touch operation with a finger, a pen, or the like.

In the embodiment, it is assumed that a width direction (transverse direction) of the chassis 50 is an X-direction, that a lengthwise direction (longitudinal direction) is a Y-direction, and that a thickness direction is a Z-direction.

Figure 2:
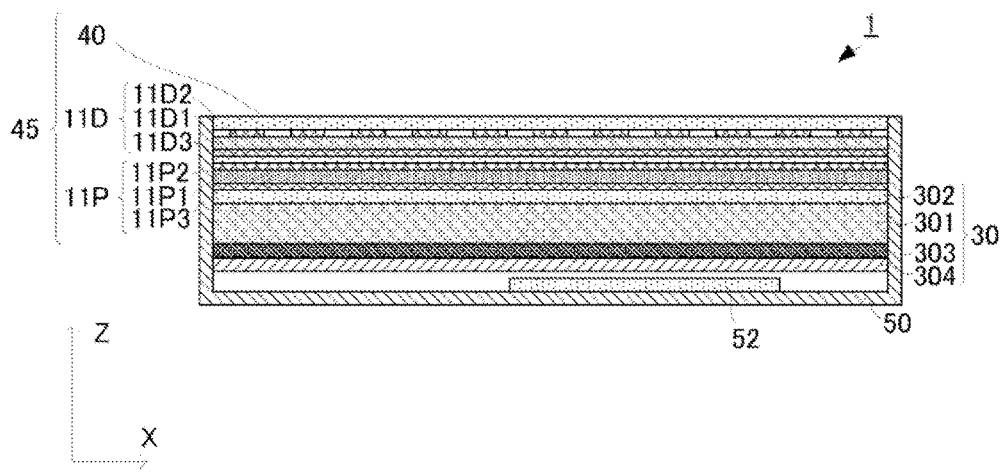
FIG. 2 is a sectional side view of the display device.

As illustrated in FIG. 2, an electrostatic capacitance sensor 11D, a pressure sensor 11P, a display 30, and a control circuit module 52 are arranged in the chassis 50. The panel 40, the electrostatic capacitance sensor 11D, and the pressure sensor 11P constitute a touch type input device 45.

The electrostatic capacitance sensor 11D, the pressure sensor 11P, the display 30, and the control circuit module 52 are arranged along the Z-direction in the order from the opening (panel 40) side of the chassis 50. The electrostatic capacitance sensor 11D, the pressure sensor 11P, and the display 30 are flat, and arranged in the chassis 50 so as to be parallel to the opening (panel 40) of the chassis 50.

A circuit board (not illustrated) is arranged between a bottom surface of the chassis 50 and the display 30, and the control circuit module 52 is mounted on the circuit board. The control circuit module 52 is a module that configures a controller 20, a processor 22, and a program storage 23 in FIG. 4.

The electrostatic capacitance sensor 11D, the pressure sensor 11P, and the processor 22 are connected to the controller 20. The controller 20, the program storage 23, and the display 30 are connected to the processor 22.

The display device 1 includes the touch type input device 45 and a host device 47. The electrostatic capacitance sensor 11D, the pressure sensor 11P, and the controller 20 constitute the touch type input device 45. The processor 22, the program storage 23, and the display 30 constitute the host device 47. In the embodiment, by way of example, the controller 20 of the touch type input device 45 and the processor 22 and program storage 23 of the host device 47 are configured by the identical control circuit module 52. Alternatively, the controller 20 and the processor 22 and program storage 23 may be configured by different control circuit modules.

The electrostatic capacitance sensor 11D corresponds to the touch sensor of the present invention, and outputs a position detection signal $D_{sd}$ according to a position of the touch operation performed on the panel 40 that is of the operation surface. The controller 20 directly outputs the position detection signal $D_{sd}$, which is output from the electrostatic capacitance sensor 11D, to the processor 22.

The processor 22 includes a CPU, and wholly controls the host device 47. That is, the processor 22 reads an action program stored in the program storage 23, and performs various pieces of processing. For example, the processor 22 controls the display 30 to display an image, fixes an operation input content in response to a position detection signal input from the controller 20, and changes the displayed image.

The pressure sensor 11P outputs a deformation detection signal $D_{sp}$ according to the pressing operation performed on the panel 40 that is of the operation surface. The controller 20 converts the deformation detection signal $D_{sp}$ output from the pressure sensor 11P into the position detection signal $D_{sd}$, and outputs the position detection signal $D_{sd}$ to the processor 22. For example, when the deformation detection signal $D_{sp}$ having a predetermined level or more is input to the controller 20, the controller 20 converts the deformation detection signal $D_{sp}$ into a position detection signal $D_{sd}$ corresponding to a pinch operation, which is of an operation to change a distance between a plurality of touch positions, and outputs the position detection signal $D_{sd}$. Therefore, for example, the processor 22 performs processing of enlarging the display image in response to the position detection signal corresponding to the input pinch operation.

For example, the display 30 is constructed with a liquid crystal display element. The display 30 includes a liquid crystal panel 301, a surface polarization plate 302, a rear-face polarization plate 303, and a backlight 304.

The surface polarization plate 302 and the rear-face polarization plate 303 are arranged so as to sandwich the liquid crystal panel 301 therebetween. The backlight 304 is arranged on the opposite side to the liquid crystal panel 301 with respect to the rear-face polarization plate 303.

Light output from the backlight 304 is polarized by the rear-face polarization plate 303, and reaches the surface polarization plate 302 through the liquid crystal panel 301. The liquid crystal panel 301 changes a polarization state in each pixel under the control of the controller 20 to change an amount of light passing through the surface polarization plate 302. The light is output through the surface polarization plate 302 to the panel 40 through the pressure sensor 11P and the electrostatic capacitance sensor 11D. Therefore, various images are displayed on the panel 40.

The electrostatic capacitance sensor 11D includes a flat insulating board 11D1, a plurality of electrostatic capacitance detecting electrodes 11D2, and a plurality of electrostatic capacitance detecting electrodes 11D3. The insulating board 11D1 is made of a transparent material such as a film made of PET, COP (cycloolefin polymer) or the like, a sheet or plate made of PC, PMMA (acrylic resin) or the like, and thin glass having a thickness of about 0.1 mm to about 0.7 mm.

Figure 3A:
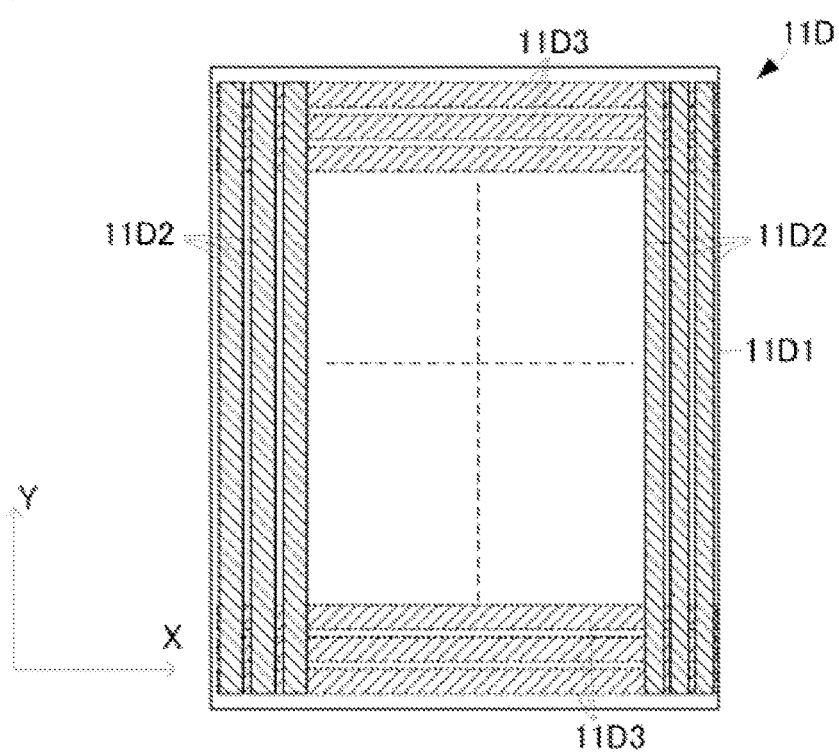
FIGS. 3(A) and 3(B) are plan views illustrating an electrostatic capacitance sensor and a pressure detection sensor.

The plurality of electrostatic capacitance detecting electrodes 11D2 are formed on one of principal surfaces of the insulating board 11D1. As illustrated in FIG. 3(A), the plurality of electrostatic capacitance detecting electrodes 11D2 have a rectangular shape that is long in one direction in a planar view, and are arranged such that elongated directions of the electrostatic capacitance detecting electrodes 11D2 are parallel to the Y-direction. The plurality of electrostatic capacitance detecting electrodes 11D2 are arranged at predetermined intervals along the X-direction.

The plurality of electrostatic capacitance detecting electrodes 11D3 are formed on the other principal surface of the insulating board 11D1. As illustrated in FIG. 3(A), the plurality of electrostatic capacitance detecting electrodes 11D3 have a rectangular shape that is long in one direction in a planar view. The plurality of electrostatic capacitance detecting electrodes 11D3 are arranged such that elongated directions of the electrostatic capacitance detecting electrodes 11D3 are parallel to the X-direction. The plurality of electrostatic capacitance detecting electrodes 11D3 are arranged at predetermined intervals along the Y-direction.

The plurality of electrostatic capacitance detecting electrodes 11D2 and the plurality of electrostatic capacitance detecting electrodes 11D3 are made of a transparent material. For example, a material mainly containing indium tin oxide (ITO), zinc oxide (ZnO), or polythiophene is used as the electrostatic capacitance detecting electrodes 11D2 and the electrostatic capacitance detecting electrodes 11D3.

In the electrostatic capacitance sensor 11D, the electrostatic capacitance detecting electrode 11D2 and the electrostatic capacitance detecting electrode 11D3 detect a change in electrostatic capacitance generated by proximity or touch of a user's finger, and output the position detection signal $D_{sd}$ to the controller 20 based on the detection.

The arrangement modes of the electrostatic capacitance detecting electrode 11D2 and electrostatic capacitance detecting electrode 11D3 are not limited to those in the embodiment.

Figure 3B:
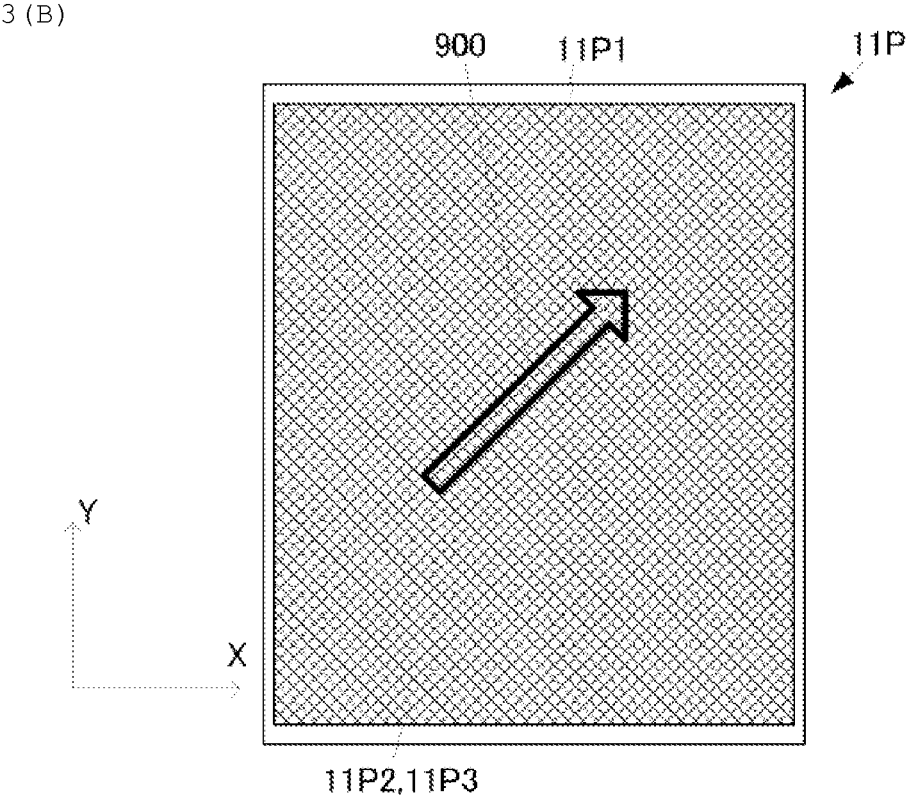

The pressure sensor 11P includes a flat piezoelectric film 11P1. A pressure detection electrode 11P2 is formed on one of principal surfaces of the piezoelectric film 11P1, and a pressure detection electrode 11P3 is formed on the other principal surface. As illustrated in FIG. 3(B), the pressure detection electrode 11P2 and the pressure detection electrode 11P3 are formed substantially wholly over the the principal surfaces of the piezoelectric film 11P1.

The pressure detection electrode 11P2 and the pressure detection electrode 11P3 are made of a transparent material. For example, a material mainly containing indium tin oxide (ITO), zinc oxide (ZnO), or polythiophene is used as the pressure detection electrode 11P2 and the pressure detection electrode 11P3.

The piezoelectric film 11P1 is bent in a normal direction to generate a charge when the user presses the panel 40. Therefore, the deformation detection signal $D_{sp}$ corresponding to the pressing operation is output to the controller 20.

Preferably a high-transparency chiral polymer is used as the piezoelectric film 11P1. More preferably uniaxially-stretched polylactic acid (PLA) or poly-L-lactic acid (PLLA) is used as the piezoelectric film 11P1. A main chain of the chiral polymer has a helical structure, and the chiral polymer exerts piezoelectricity when being uniaxially stretched to orientate molecules. An amount of charge generated by the uniaxially-stretched chiral polymer is uniquely fixed by an amount of displacement of the panel 40 in the normal direction.

A piezoelectric constant of the uniaxially-stretched PLLA falls into a category of extremely high piezoelectric constant in polymers. The pressing operation is detected with high sensitivity, and the deformation detection signal can accurately be output according to a pressing amount.

In the chiral polymer, the piezoelectricity is generated by a molecule orientation process such as the stretching, but it is not necessary to perform a polarization process unlike other polymers such as PVDF and other piezoelectric ceramics. Therefore, a piezoelectric constant of PLLA does not vary over time, but is extremely stable. Because polylactic acid has no pyroelectricity, the detected charge amount does not change even if heat of the user's finger is transmitted to the pressure sensor arranged close to the operation surface. In the embodiment, as illustrated in FIG. 3(B), a uniaxially-stretching direction 900 of the piezoelectric film 11P1 has an angle of about 45° with respect to the X-direction and the Y-direction. Therefore, the pressing operation can be detected with higher sensitivity.

Preferably a stretching ratio ranges from about 3 times to about 8 times. When a heat treatment is performed after the stretching, crystallization of an extended chain crystal of polylactic acid is promoted to improve the piezoelectric constant. For biaxial stretching, an effect similar to that of the uniaxial stretching can be obtained by varying the stretching ratio in each axis. For example, in the case that the stretching ratio of 8 times is set to the X-axis direction while the stretching ratio of 2 times is set to the Y-axis direction orthogonal to the X-axis direction, the effect similar to the uniaxial stretching in which the stretching ratio of 4 times is set to the X-axis direction is obtained with respect to the piezoelectric constant. While the simply uniaxially-stretched film tears easily along the stretching-axis direction, strength can be increased to a certain degree by biaxial stretching.

Although the pressure sensor is not limited to the piezoelectric sensor as in the embodiment, the piezoelectric sensor can detect even a light pressure applied to the panel 40. The piezoelectric film 11P1 is not limited to PLLA. Alternatively, a low-transparency material such as PVDF may be used as the piezoelectric film 11P1. For the use of the low-transparency material, the pressure sensor 11P is arranged below the backlight 304. In this case, an electrode formed by a silver paste or a metallic conductor formed by evaporation, sputtering, or plating may be used as the pressure detection electrode 11P2 and the pressure detection electrode 11P3.

Figure 5A:
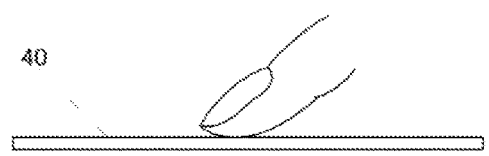
FIGS. 5(A) and 5(B) are views illustrating a concept in which a deformation detection signal is converted into a position detection signal.
Figure 5A:
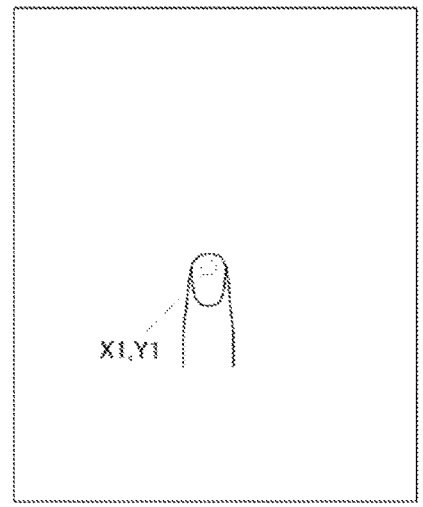
Figure 5B:
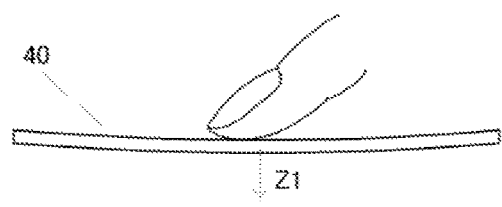
Figure 5B:
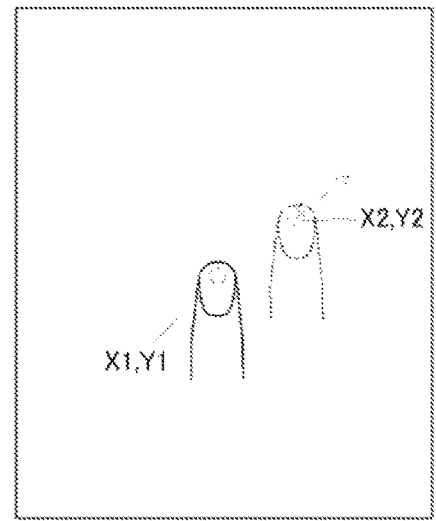

The controller 20 converts the deformation detection signal $D_{sp}$ input from the pressure sensor 11P into the position detection signal $D_{sd}$, and outputs the position detection signal $D_{sd}$ to the processor 22. FIGS. 5A and 5B are views illustrating a concept in which the deformation detection signal $D_{sp}$ is converted into the position detection signal $D_{sd}$, and FIG. 6 is a flowchart illustrating action of the controller 20.

Figure 6:
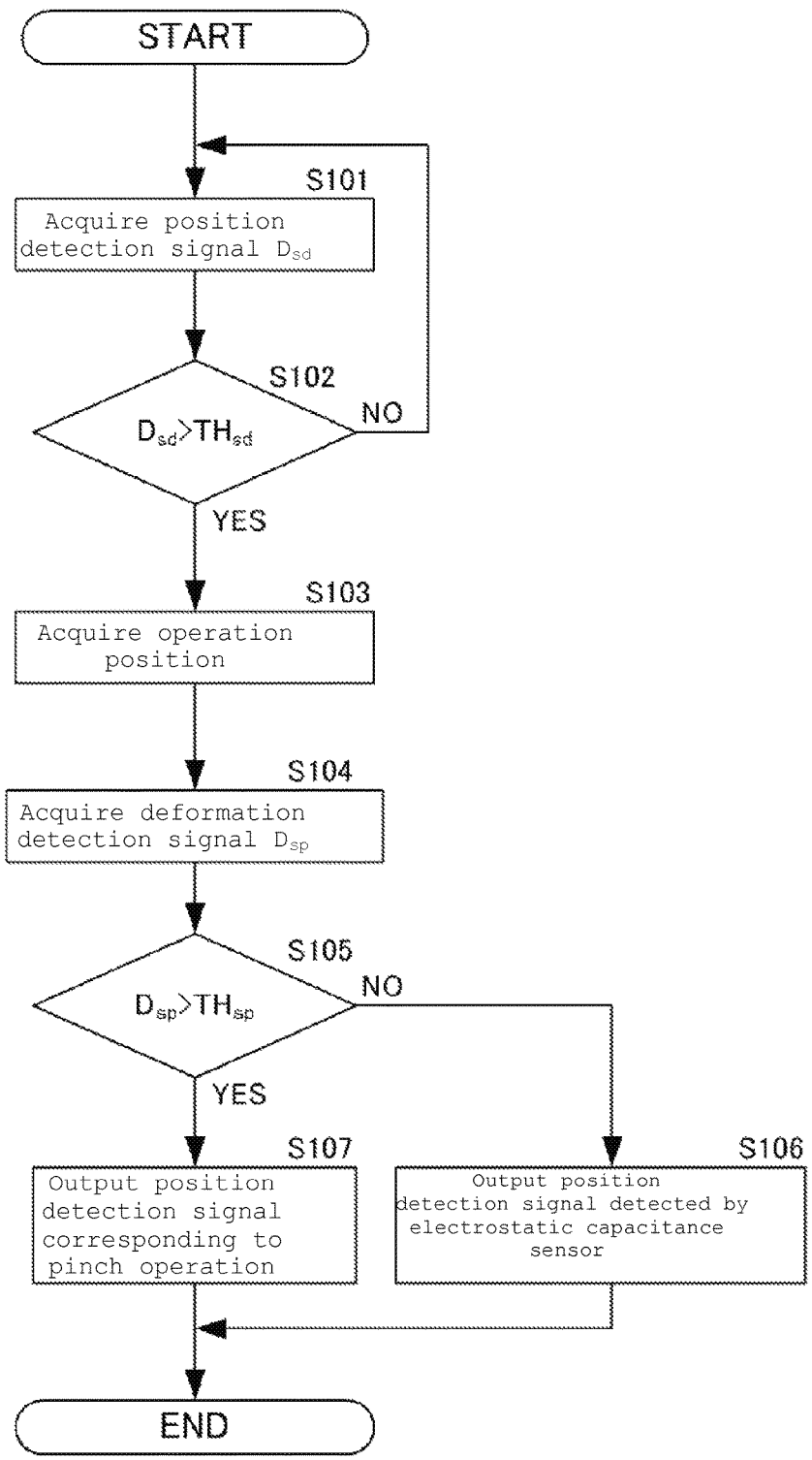
FIG. 6 is a flowchart illustrating action of a controller.

Referring to FIG. 6, the controller 20 acquires the position detection signal $D_{sd}$ from the electrostatic capacitance sensor 11D (S101). The controller 20 repeats the processing in S101 when determining that the level of the position detection signal $D_{sd}$ is less than or equal to a threshold $TH_{Sd}$ (NO in S102). When determining that the level of the position detection signal $D_{sd}$ is greater than the threshold $TH_{Sd}$ (YES in S102), the controller 20 detects the touch operation and the position of the touch operation (S103). As illustrated in FIG. 5(A), a position (X1,Y1) where the touch operation is performed is detected when the user brings the finger close to the panel 40 or touches the panel 40 with the finger.

The controller 20 acquires a deformation detection signal $D_{sp}$ from the pressure sensor 11P (S104). When determining that the level of the deformation detection signal $D_{sp}$ is less than or equal to the threshold $TH_{sp}$ (NO in S105), the controller 20 outputs the position detection signal $D_{sd}$ input from the electrostatic capacitance sensor 11D to the processor 22 (S106). That is, the controller 20 outputs the position detection signal $D_{sd}$ indicating the position (X1,Y1) to the processor 22 by assuming that the touch operation is performed at the detected position (X1,Y1).

On the other hand, when determining that the level of the deformation detection signal $D_{sp}$ is greater than the threshold $TH_{sp}$ (YES in S105), the controller 20 outputs the position detection signal $D_{sd}$ corresponding to the pinch operation to the processor 22 (S107). As used herein, the pinch operation means an operation to change the distance between the plurality of touch positions.

As illustrated in FIG. 5(B), assuming that the touch operation is performed at the position (X1,Y1) detected in S103 and virtually at another position (X2,Y2) different from the position (X1,Y1), the controller 20 outputs the position detection signal $D_{sd}$ to the processor 22 indicating that the two touch positions (X1,Y1) and (X2,Y2) separate from each other based on the touch position (X1,Y1). Thus, the controller 20 outputs the position detection signal $D_{sd}$ corresponding to a pinch-out operation to the processor 22.

Any position may be used as the position (X2,Y2) of the virtual touch operation, and any direction may be used as the direction in which the two touch positions (X1,Y1) and (X2,Y2) separate from each other. The position detection signal $D_{sd}$ corresponding to the pinch-out operation is continuously output during a period in which the deformation detection signal $D_{sp}$ greater than the threshold $TH_{sp}$ is input. Therefore, the position detection signal $D_{sd}$ corresponding to the pinch-out operation is continuously output while the user performs the pressing operation. The controller 20 may control a change amount of the distance according to the level (a displacement amount Z1 in the direction normal to the panel 40) of the deformation detection signal $D_{sp}$. For example, the controller 20 changes the distance between the two touch positions in proportion to the level (the displacement amount Z1 in the direction normal to the panel 40) of the deformation detection signal $D_{sp}$. The controller 20 changes speeds of the two touch positions in proportion to the level (the displacement amount Z1 in the direction normal to the panel 40) of the deformation detection signal $D_{sp}$.

The processor 22 receives the pinch-out operation to perform processing according to the pinch-out operation. For example, in the case that processor 22 receives the pinch-out operation to perform the processing of enlarging the image displayed on the display 30, the image enlarging processing is performed when the user performs the pressing operation on the panel 40. The image enlarging processing is continuously performed while the user performs the pressing operation on the panel 40 because the position detection signal $D_{sd}$ corresponding to the pinch-out operation is continuously output. For the host device 47, this is equivalent to the case where the host device 47 receives the deformation detection signal $D_{sp}$ of the pressing operation to perform the image enlarging processing according to the deformation detection signal $D_{sp}$ of the pressing operation.

In the processing in S107 of FIG. 6, the controller 20 may output the position detection signal $D_{sd}$ corresponding to not the pinch-out operation but a pinch-in operation to the processor 22. In this case, assuming that the touch operation is performed at the initially-detected position (X1,Y1) and virtually at another position (X2,Y2) different from the position (X1,Y1), the controller 20 outputs the position detection signal $D_{sd}$ to the processor 22 indicating that the two touch positions (X1,Y1) and (X2,Y2) come close to each other based on the touch position (X1,Y1).

Any position may be used as the position (X2,Y2) of the virtual touch operation, and any direction may be used as the direction in which the two touch positions (X1,Y1) and (X2,Y2) come close to each other. The position detection signal $D_{sd}$ corresponding to the pinch-in operation is continuously output during a period in which the deformation detection signal $D_{sp}$ greater than the threshold $TH_{sp}$ is input. The controller 20 may control a change amount of the distance according to the level (a displacement amount Z1 in the direction normal to the panel 40) of the deformation detection signal $D_{sp}$.

The processor 22 receives the pinch-in operation to perform processing according to the pinch-in operation. For example, in the case that processor 22 receives the pinch-in operation to perform the processing of reducing the image displayed on the display 30, the image reducing processing is performed when the user performs the pressing operation on the panel 40. The image reducing processing is continuously performed while the user performs the pressing operation on the panel 40 because the position detection signal $D_{sd}$ corresponding to the pinch-in operation is continuously output. For the host device 47, this is equivalent to the case where the host device 47 receives the deformation detection signal $D_{sp}$ of the pressing operation to perform the image reducing processing according to the deformation detection signal $D_{sp}$ of the pressing operation.

The touch type input device 45 converts the deformation detection signal $D_{sp}$ of the pressing operation into the position detection signal $D_{sd}$ of the pinch operation and outputs the position detection signal $D_{sd}$. Therefore, it is not necessary to add special software (driver) used to receive and process the deformation detection signal $D_{sp}$ onto the side of the host device 47, but the host device 47 can receive and process the deformation detection signal $D_{sp}$. Accordingly, even if the OS in which the addition of the special driver is prohibited is installed on the host device 47, the deformation detection signal $D_{sp}$ can be received and processed.

The user can perform the pinch operation on the panel 40 by one of hands while holding the chassis 50 by the other hand, and the user can perform the same operation as the pinch operation only by performing the pressing operation on the panel 40 with a thumb of the hand holding the chassis 50.

For example, in the case that the display device 1 is a conventional smartphone, it is necessary for the user to perform the pinch operation by one of hands while holding the chassis 50 by the other hand. That is, in the conventional smartphone, the user hardly performs the pinch operation in one hand while holding the chassis 50. However, when the touch type input device of the present invention is applied, the pressing operation is converted into the pinch operation, which allows the user to perform the same operation as the pinch operation only by performing the pressing operation with the thumb of the hand holding the chassis 50.

The position (X2,Y2) of the virtual touch operation may be set as follows. When determining that the level of the deformation detection signal $D_{sp}$ is greater than the threshold $TH_{sp}$ (YES in S105), the controller 20 assumes that the touch operation is virtually performed at the position (X2, Y2) close to (for example, about 5 mm away from) the initially-detected position (X1,Y1), and outputs the position detection signal $D_{sd}$ to the processor 22 only for a short time (for example, 50 ms) indicating that the two touch positions (X1,Y1) and (X2,Y2) separate from (or come close to) each other based on the position (X1,Y1). When the deformation detection signal $D_{sp}$ greater than the threshold $TH_{sp}$ is continuously input, the controller 20 assumes that the touch operation is virtually performed at the position (X2,Y2) close to (for example, about 5 mm away from) the initially-detected position (X1,Y1), and outputs the position detection signal $D_{sd}$ to the processor 22 only for a short time (for example, 50 ms) such that the two touch positions (X1,Y1) and (X2,Y2) separate from (or come close to) each other based on the position (X1,Y1). The controller 20 repeatedly outputs the position detection signal $D_{sd}$ during the period in which the deformation detection signal $D_{sp}$ greater than the threshold $TH_{sp}$ is continuously input.

For example, when the position detection signal $D_{sd}$ corresponding to the pinch operation is input while the processor 22 executes application software in which the pinch operation is not required, sometimes the processor 22 receives the position detection signal $D_{sd}$ as a swipe operation in which the user moves the finger in the longitudinal or transverse direction while performing the touch operation on the touch panel, and the processor 22 performs image scrolling processing. At this point, when the user strongly taps the panel 40, sometimes the pressing operation is detected to input the position detection signal $D_{sd}$ corresponding to the pinch operation, and the image is involuntarily scrolled. In contrast, in the embodiment, the controller 20 outputs the signal similar to the signal at the time of the pinch operation performed for an extremely short time by a very short distance in the neighborhood of the initially-detected position (X1,Y1). Therefore, the image is not scrolled when only the panel 40 is strongly tapped. On the other hand, when the user actually performs the pressing operation while the processor 22 executes the application software requiring the pinch operation (for example, for enlarging or reducing an image), because the signal similar to the signal at the time of the pinch operation is repeatedly output, the image enlarging or reducing processing is performed.

Figure 7:
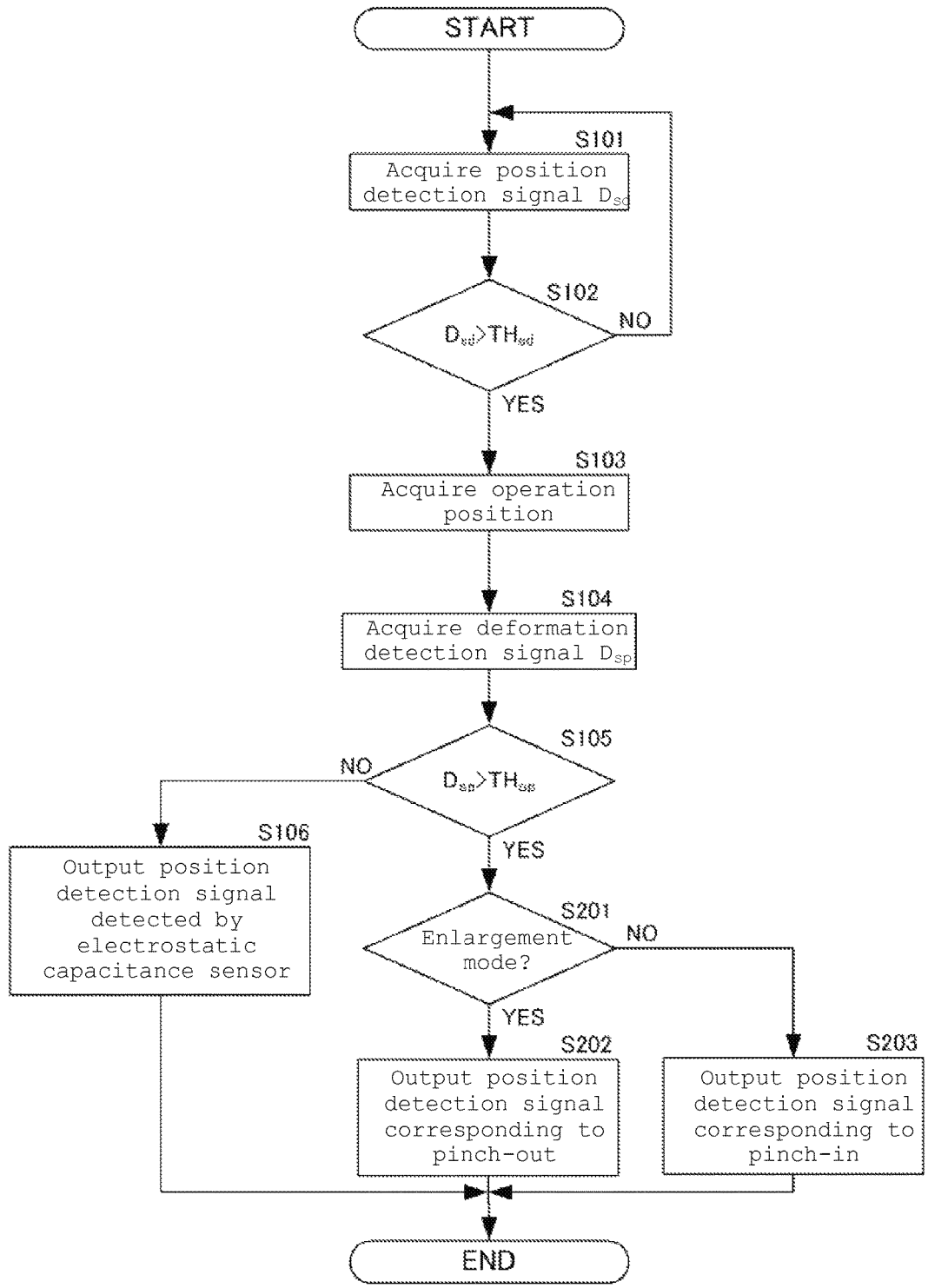
FIG. 7 is a flowchart illustrating action of a controller according to a first application example.

FIG. 7 is a flowchart illustrating action of the controller 20 according to a first application example. In FIG. 7, the processing in common with the processing in FIG. 6 is designated by the identical symbol, and the description is omitted. The controller 20 of the first application example performs one of an enlargement mode and a reduction mode, outputs the deformation detection signal $D_{sp}$ of the pressing operation to the processor 22 as the position detection signal $D_{sd}$ corresponding to the pinch-out operation while the enlargement mode is performed, and outputs the deformation detection signal $D_{sp}$ of the pressing operation to the processor 22 as the position detection signal $D_{sd}$ corresponding to the pinch-in operation while the reduction mode is performed.

When determining that the level of the deformation detection signal $D_{sp}$ is greater than the threshold $TH_{sp}$ (YES in S105), the controller 20 determines whether the current mode is the enlargement mode (S201). When determining that the enlargement mode is currently performed (YES in S201), the controller 20 outputs the position detection signal $D_{sd}$ corresponding to the pinch-out operation to the processor 22 (S202). On the other hand, when determining that the enlargement mode is not currently performed, namely, that the reduction mode is currently performed (NO in S201), the controller 20 outputs the position detection signal $D_{sd}$ corresponding to the pinch-in operation to the processor 22 (S203).

For example, switching between the enlargement mode and the reduction mode is performed when the position detection signal $D_{sd}$ corresponding to the touch operation is input a predetermined number of times (for example, 3 times) within a predetermined time (for example, 1 second) from the electrostatic capacitance sensor 11D.

Figure 8:
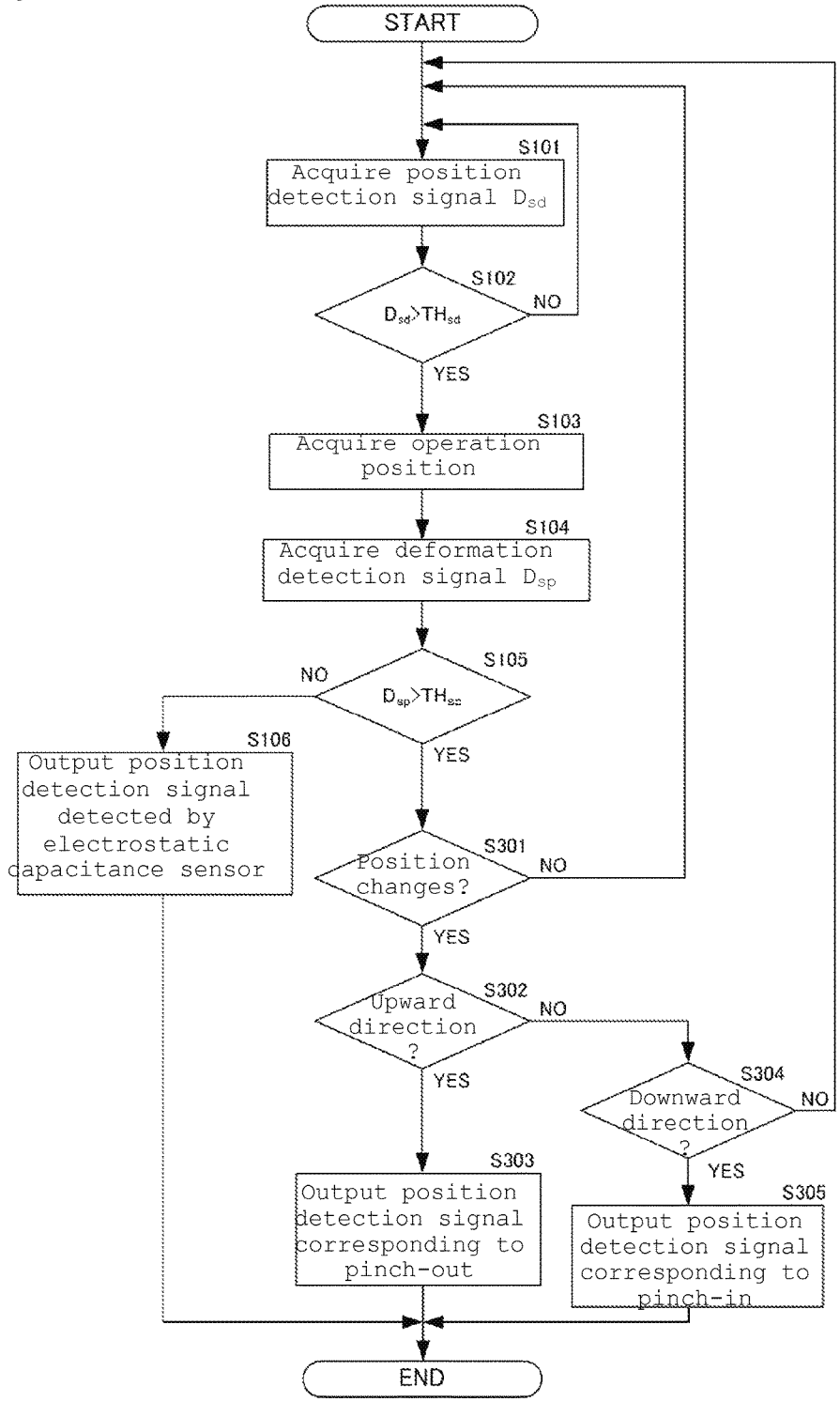
FIG. 8 is a flowchart illustrating action of a controller according to a second application example.

FIG. 8 is a flowchart illustrating action of the controller 20 according to a second application example. The processing in common with the processing in FIG. 6 is designated by the identical symbol, and the description is omitted. When determining that the level of the deformation detection signal $D_{sp}$ is greater than the threshold $TH_{sp}$ (YES in S105), the controller 20 of the first application example determines whether the touch position is changed from the initially-detected position (X1,Y1) (S301). The controller 20 repeats the pieces of processing from S101 when the touch position is not changed, namely, when the user performs only the pressing operation. On the other hand, when the touch position is changed, namely, when the user moves the finger in any direction while performing the pressing operation, the controller 20 determines whether the user's finger is moved in the upward direction (S302). As used herein, the upward direction is the Y-direction of the panel 40. The controller 20 determines that the user's finger is moved in the upward direction when a Y-coordinate of the position (X1,Y1) is changed onto the positive side. When determining that the user's finger is moved in the upward direction (YES in S302), the controller 20 outputs the position detection signal $D_{sd}$ corresponding to the pinch-out operation to the processor 22 (S303). On the other hand, when determining that the user's finger is moved in the upward direction (NO in S302), the controller 20 further determines whether the user's finger is moved in the downward direction (S304). As used herein, the downward direction is the −Y-direction of the panel 40. The controller 20 determines that the user's finger is moved in the downward direction when the Y-coordinate of the position (X1,Y1) is changed onto the negative side. When the user's finger is not moved in the upward and downward directions (NO in S304), the controller 20 repeats the pieces of processing from S101. When determining that the user's finger is moved in the downward direction (YES in S304), the controller 20 outputs the position detection signal $D_{sd}$ corresponding to the pinch-in operation to the processor 22 (S305). Therefore, the user can issue the enlarging or reducing instruction by an intuitive operation.

Figure 9:
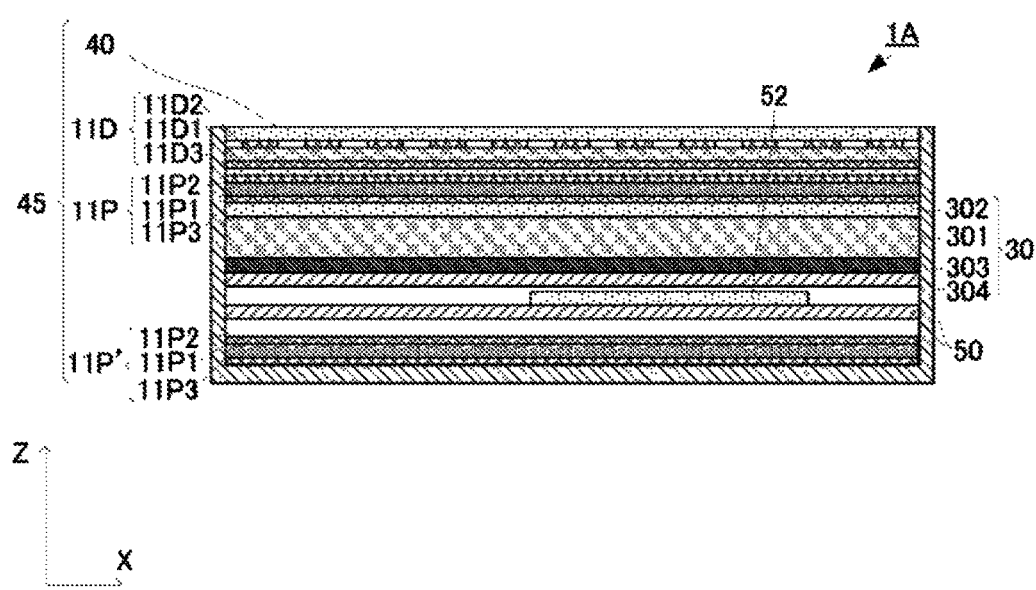
FIG. 9 is a sectional side view of a display device according to a third application example.
Figure 10:
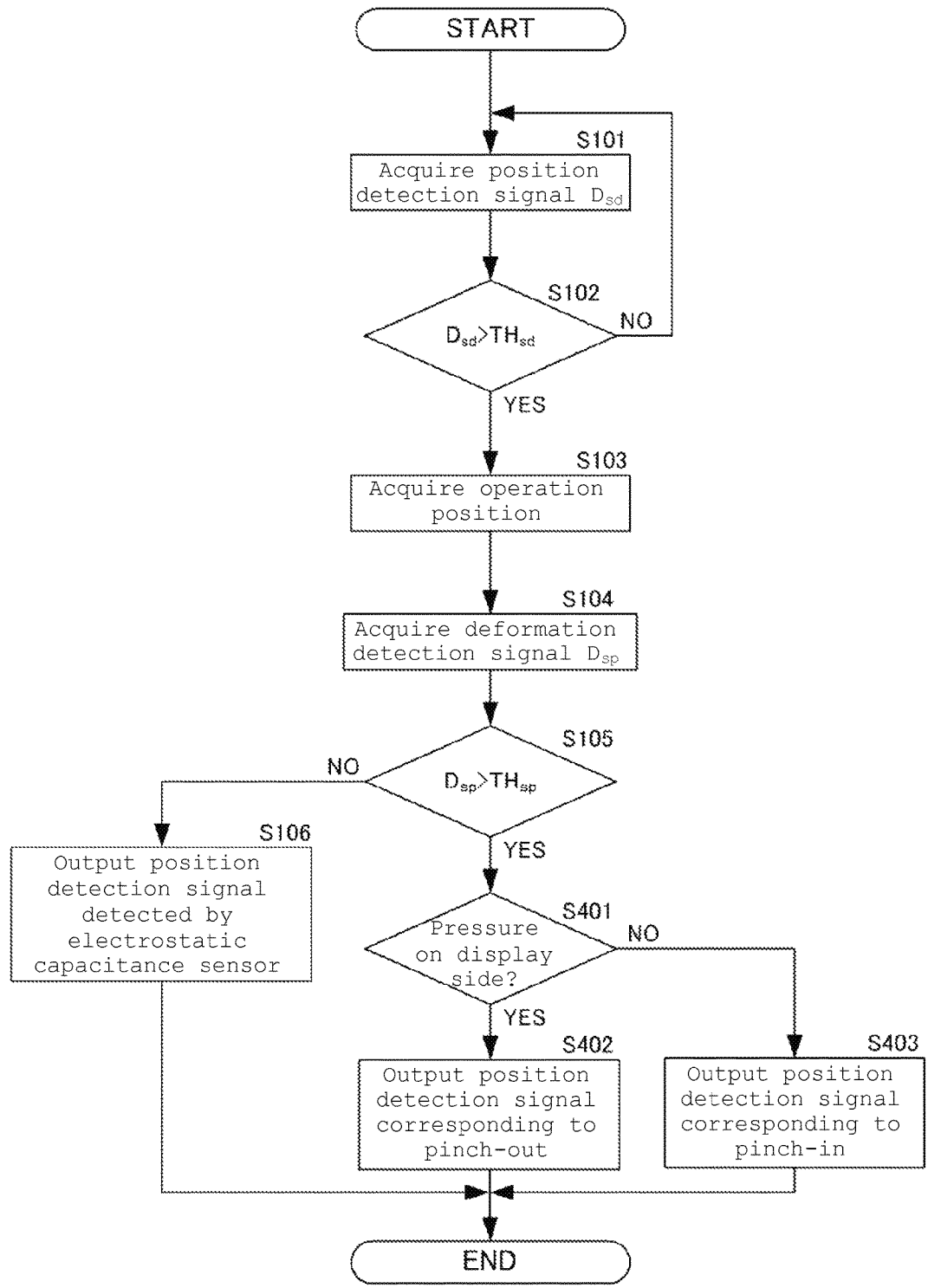
FIG. 10 is a flowchart illustrating action of a controller according to the third application example.

FIG. 9 is a sectional side view illustrating a display device 1A according to a third application example, and FIG. 10 is a flowchart illustrating action of the controller 20 of the third application example. In FIG. 9, the processing in common with the processing in FIG. 2 is designated by the identical symbol, and the description is omitted. In FIG. 10, the processing in common with the processing in FIG. 6 is designated by the identical symbol, and the description is omitted.

In the display device 1A of the third application example, as illustrated in FIG. 9, a pressure sensor 11P' is further provided on a rear-face side of the chassis 50 in order to detect the pressing operation performed on the rear-face side of the chassis 50. Other configurations are similar to those of the display device 1. However, the deformation detection signal $D_{sp}$ output from the pressure sensor 11P on the side of the panel 40 and the deformation detection signal $D_{sp}$ output from the pressure sensor 11P' on the rear-face side of the chassis 50 are individually input to the controller 20. As illustrated in FIG. 10, when determining that the level of the deformation detection signal $D_{sp}$ is greater than the threshold $TH_{sp}$ (YES in S105), the controller 20 determines whether the deformation detection signal $D_{sp}$ output from the pressure sensor 11P on the side of the panel 40 is greater than the threshold $TH_{sp}$, namely, whether the pressing operation is performed on the side of the panel 40 (display 30) (S401). When determining that the pressing operation is performed on the side of the panel 40 (display 30) (YES in S401), the controller 20 outputs the position detection signal $D_{sd}$ corresponding to the pinch-out operation to the processor 22 (S402). On the other hand, when determined that the pressing operation is performed on not the side of the panel 40 (display 30) but the rear-face side of the chassis 50 (NO in S401), the controller 20 outputs the position detection signal $D_{sd}$ corresponding to the pinch-in operation to the processor 22 (S403). In this case, the user can also issue the enlarging or reducing instruction by the intuitive operation.

Figure 11A:
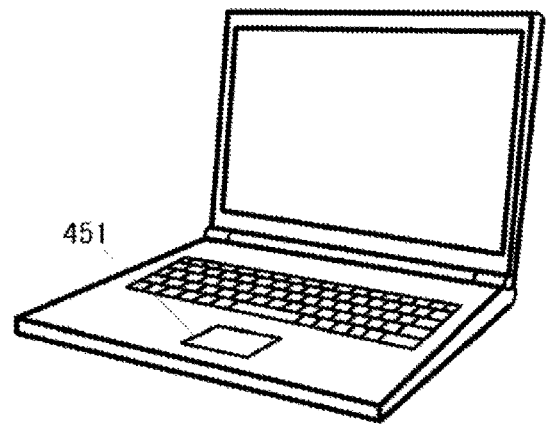
FIG. 11(A) is a perspective view illustrating an appearance when the touch type input device is used as a touch pad.
Figure 11B:
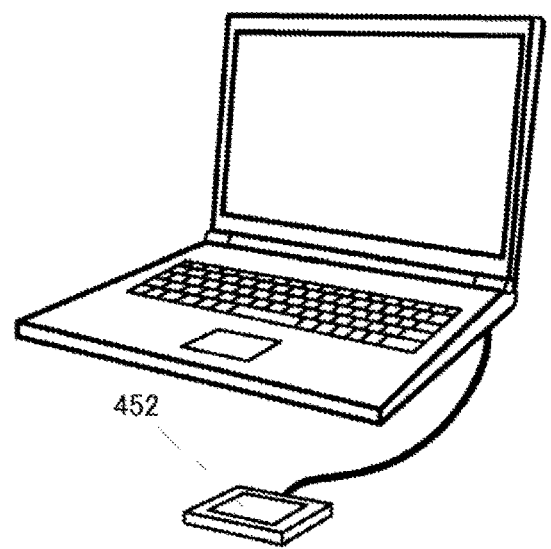
FIG. 11(B) is a perspective view illustrating an appearance when the touch type input device is used as an external touch pad.

In the embodiment, by way of example, the touch type input device is incorporated in the display device 1 to detect the pressing operation performed on the panel 40 (display 30). Alternatively, as illustrated in FIG. 11(A), a touch pad 451 may be provided independently of the panel 40 to detect the pressing operation performed on the touch pad 451. As illustrated in FIG. 11(B), an external touch pad 452 may be provided to detect the pressing operation performed on the external touch pad 452.

Figure 4:
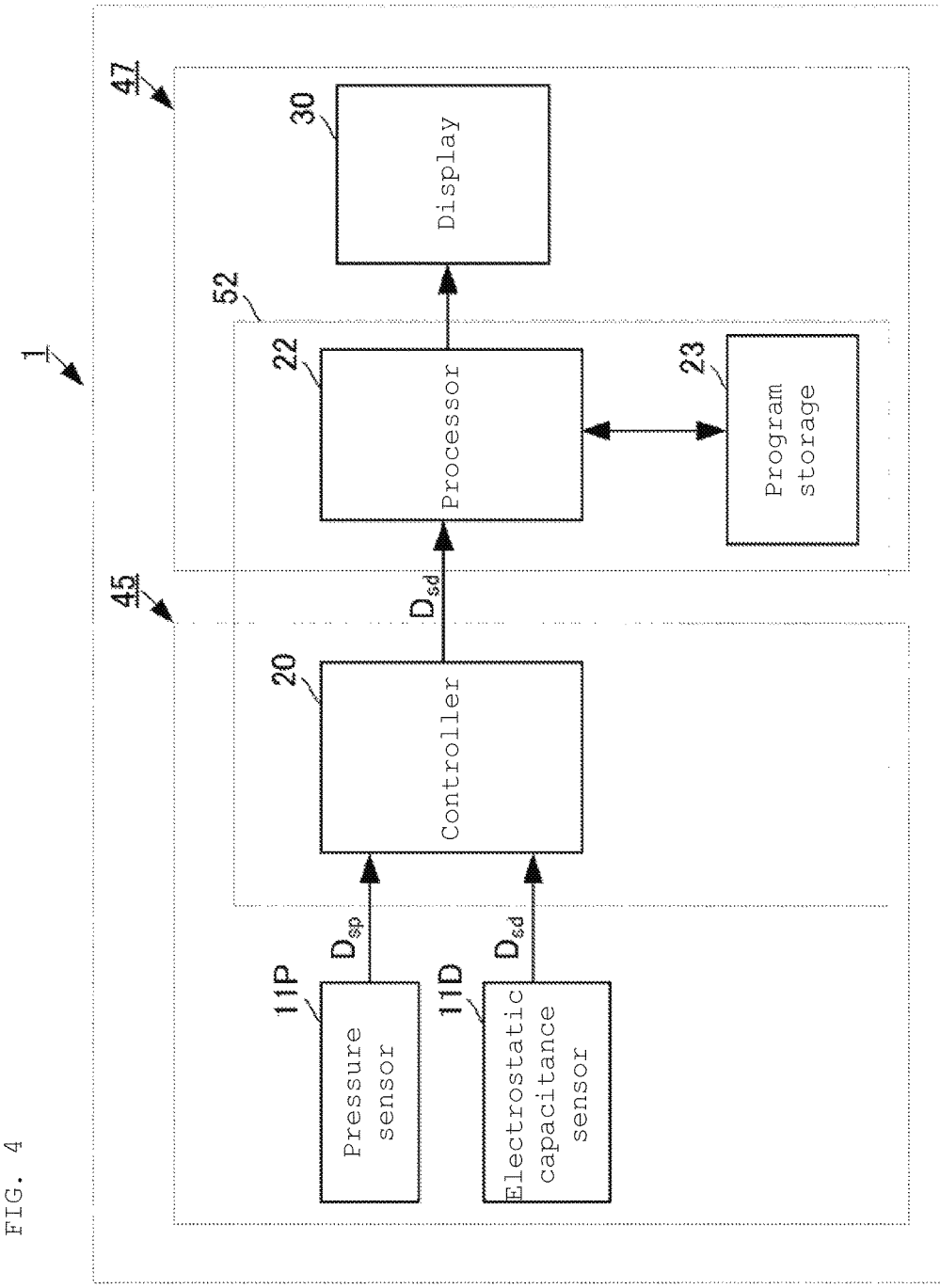
FIG. 4 is a block diagram of the display device.
Figure 12:
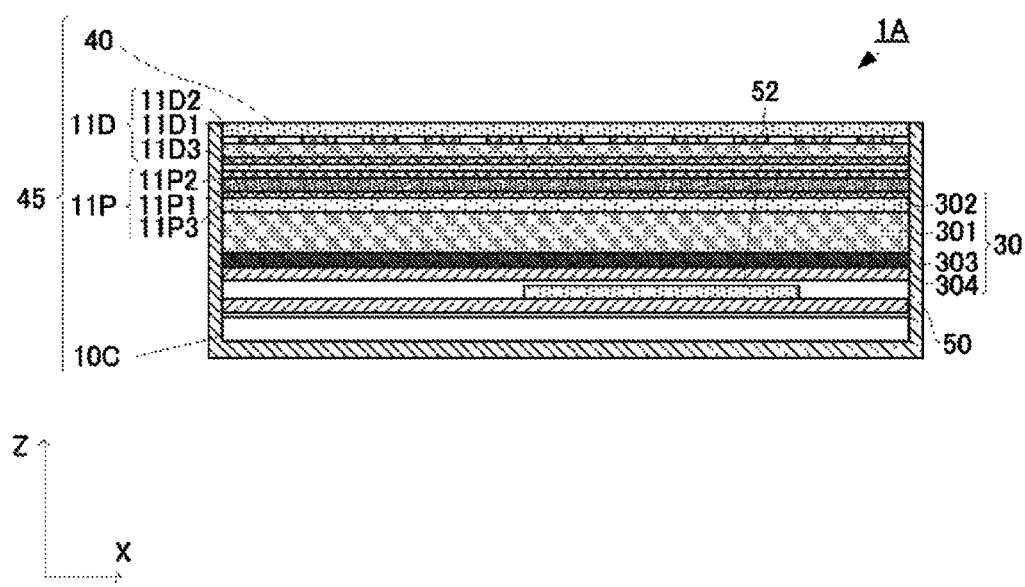
FIG. 12 is a sectional side view illustrating a display device that detects a bending operation or a twisting operation.
Figure 13:
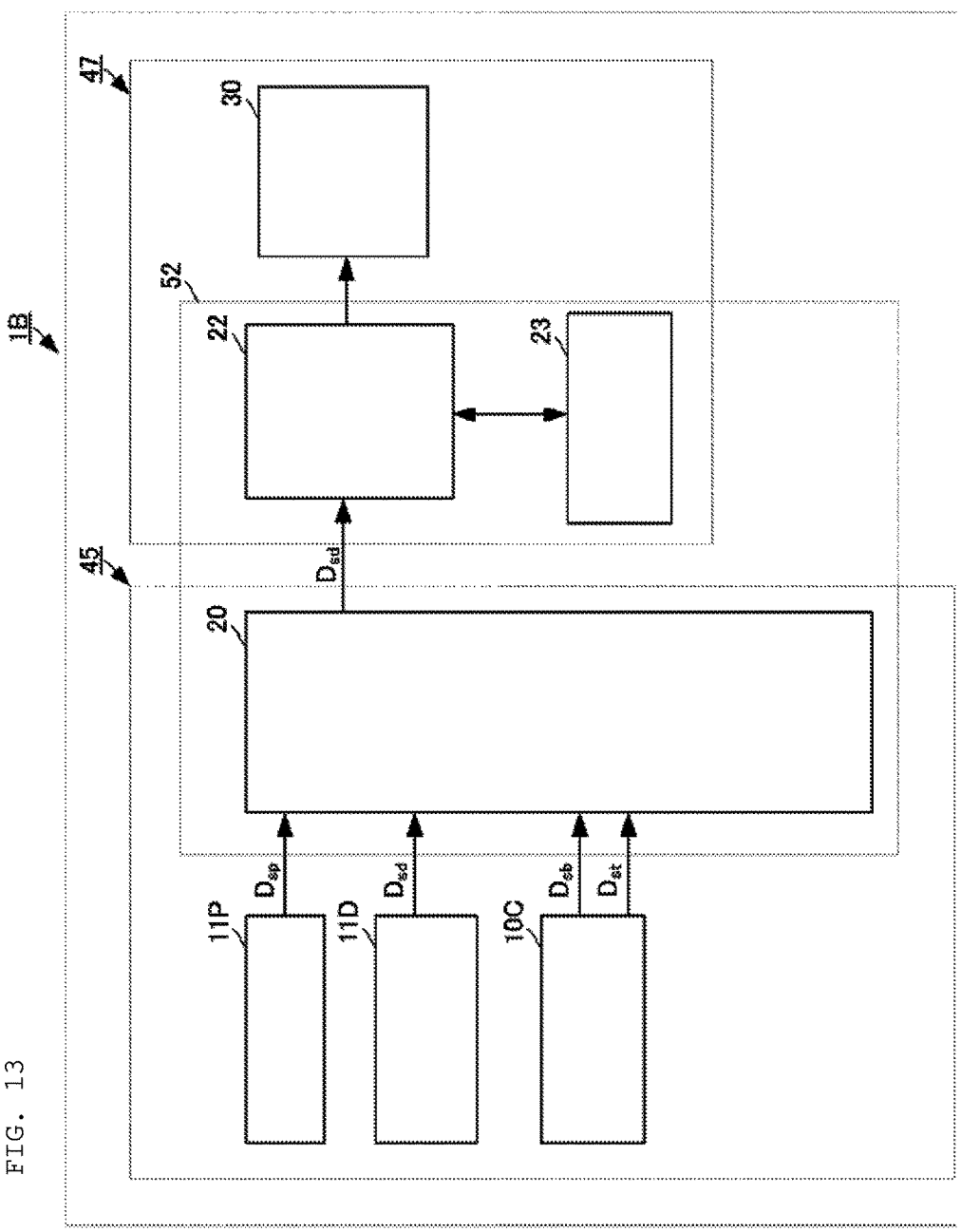
FIG. 13 is a block diagram illustrating a configuration of a display device 1B.

In the embodiment, by way of example, the pressing operation is detected as the deformation operation. Alternatively the bending operation or the twisting operation may be detected as the deformation operation. FIG. 12 is a sectional side view illustrating a display device 1B that detects the bending operation or the twisting operation, and FIG. 13 is a block diagram illustrating a configuration of the display device 1B. In FIG. 12, the processing in common with the processing in FIG. 2 is designated by the identical symbol, and the description is omitted. In FIG. 13, the processing in common with the processing in FIG. 4 is designated by the identical symbol, and the description is omitted.

In the display device 1B, as illustrated in FIG. 12, a displacement sensor 10C that can individually detect the bending operation or twisting operation performed on the chassis 50 is provided on the rear-face side of the chassis 50. As illustrated in FIG. 13, the deformation detection signal $D_{sb}$ corresponding to the bending operation and the deformation detection signal $D_{st}$ corresponding to the twisting operation are input to the controller 20 from the displacement sensor 10C. Other configurations are similar to those of the display device 1. Alternatively, the displacement sensor 10C may be provided on the side of the panel 40 to detect the bending operation or twisting operation performed on the panel 40, in place of detecting the operation on the chassis 50.

Figure 14A:
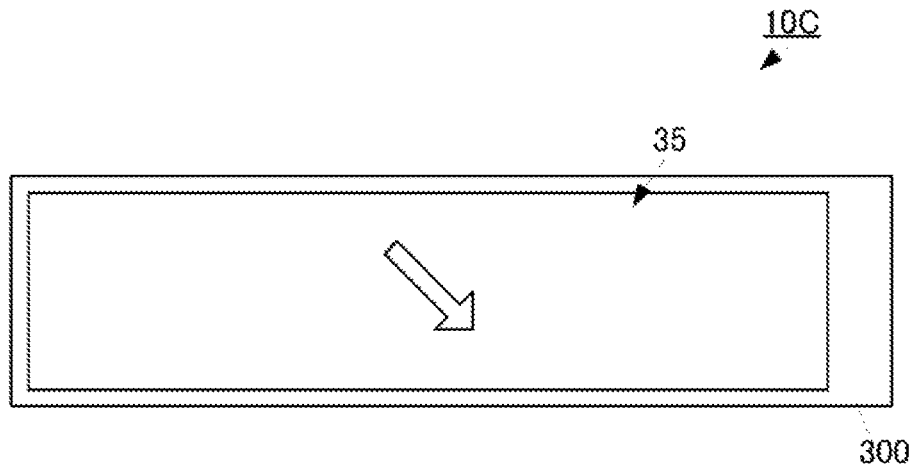
FIG. 14(A) is a plan view of a displacement sensor 10C.
Figure 14B:
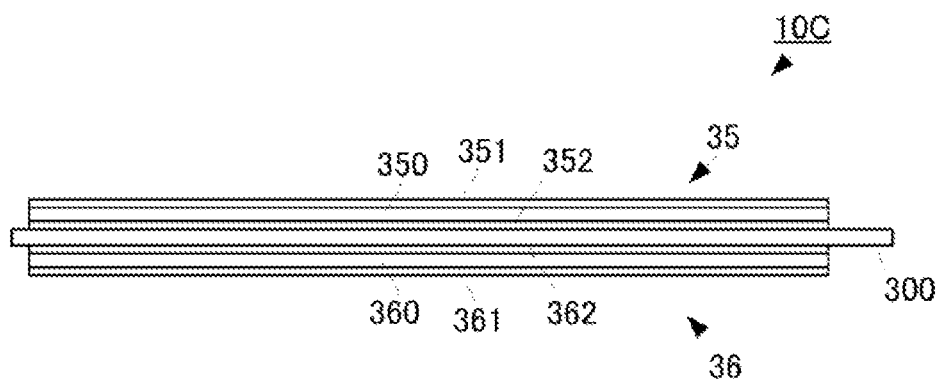
FIG. 14(B) is a side view of the displacement sensor 10C.
Figure 14C:
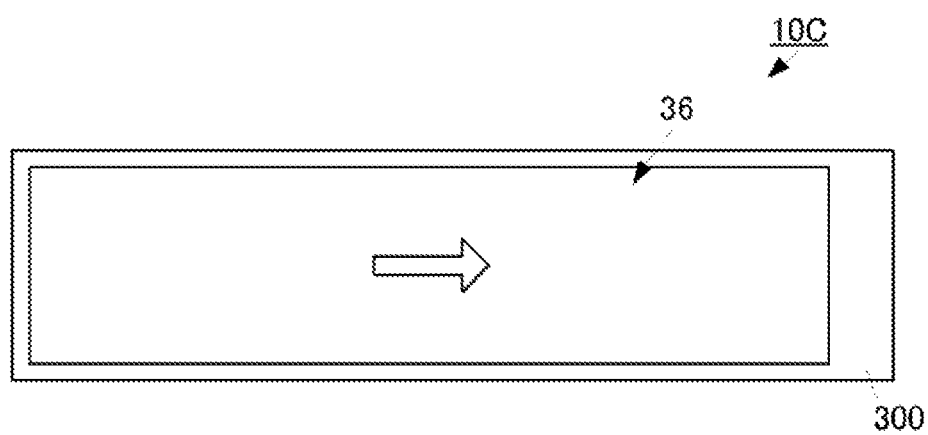
FIG. 14(C) is a rear view of the displacement sensor 10C.

FIG. 14(A) is a plan view of the sensor 10C, FIG. 14(B) is a side view of the sensor 10C, and FIG. 14(C) is a rear view of the sensor 10C.

The displacement sensor 10C includes an elastic body 300, a first piezoelectric element 35 that is attached to one of principal surfaces of the elastic body 300, and a second piezoelectric element 36 that is attached to the other principal surface of the elastic body 300. The first piezoelectric element 35 includes a rectangular piezoelectric sheet 350. The piezoelectric sheet 350 is made of a chiral polymer (particularly, PLLA). The piezoelectric sheet 350 is formed such that the longitudinal direction and uniaxially-stretching direction of the piezoelectric sheet 350 form an angle of 45°. An electrode 351 and an electrode 352 are formed substantially wholly over the respective principal surfaces of the piezoelectric sheet 350.

The second piezoelectric element 36 includes a rectangular piezoelectric sheet 360. The piezoelectric sheet 360 is made of a chiral polymer (particularly, PLLA). The piezoelectric sheet 360 is formed such that the longitudinal direction and uniaxially-stretching direction of the piezoelectric sheet 360 are parallel to each other (form an angle of 0°). An electrode 361 and an electrode 362 are formed substantially wholly over the respective principal surfaces of the piezoelectric sheet 360.

Figure 15A:
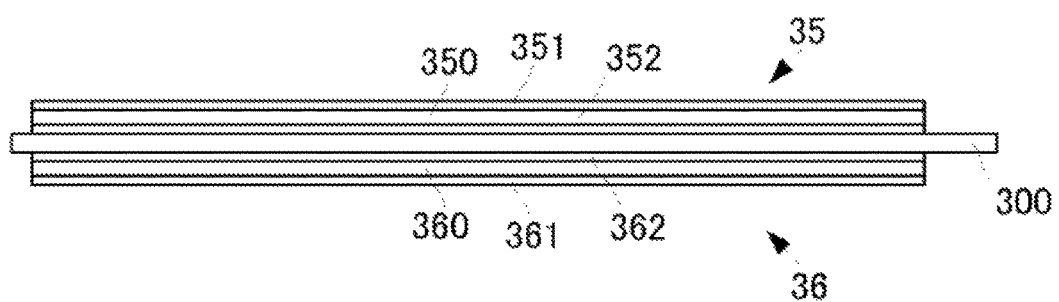
FIG. 15(A) is a view illustrating a schematic side shape of the displacement sensor 10C in a state of a bending displacement of 0.
Figure 15B:
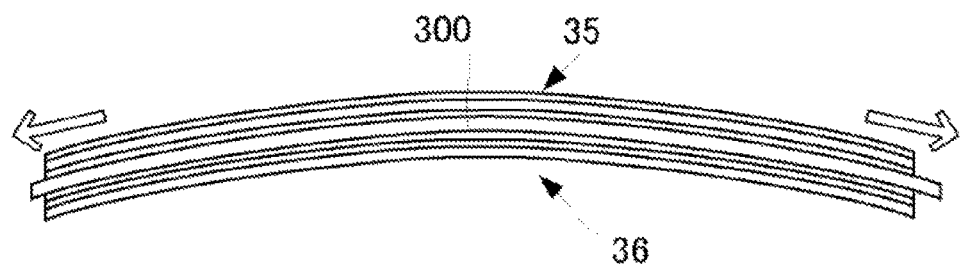
FIG. 15(B) is a view illustrating a schematic side shape of the displacement sensor 10C in the state in which a predetermined bending displacement is generated.

As illustrated in FIGS. 15(A) and 15(B), the first piezoelectric element 35 can detect the bending operation. FIG. 15(A) is a view illustrating a schematic side shape of the displacement sensor 10C in the state of the bending displacement of 0, and FIG. 15(B) is a view illustrating a schematic side shape of the displacement sensor 10C in the state in which a predetermined bending displacement is generated.

As illustrated in FIG. 15(A), for the bending displacement of 0, namely, in the case that a force generating the bending is not externally applied to the chassis 50 (displacement sensor 10C), the principal surfaces of the elastic body 300 are flat. In this case, the first piezoelectric element 35 and the second piezoelectric element 36 neither extends nor contracts, and the voltage is not generated. For the bending displacement of a predetermined value, namely, in the case that the force generating the bending is externally applied to the displacement sensor 10C, the elastic body 300 is curved along the longitudinal direction of the principal surface as illustrated in FIG. 15(B). In this case, the first piezoelectric element 35 extends along the longitudinal direction according to a bending amount. Therefore, the voltage corresponding to the extension amount is generated between the electrodes 351 and 352 of the first piezoelectric element 35. By detecting the voltage, the displacement sensor 10C can detect the extension of the first piezoelectric element 35, namely, the bending operation of the displacement sensor 10C and the bending amount of the bending operation.

Figure 16A:
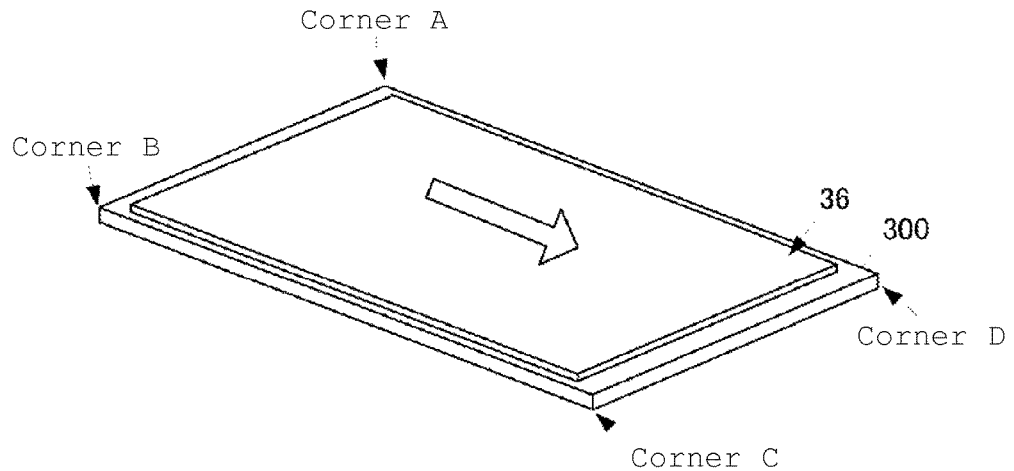
FIG. 16(A) is a view illustrating a schematic perspective shape of the displacement sensor 10C.
Figure 16B:
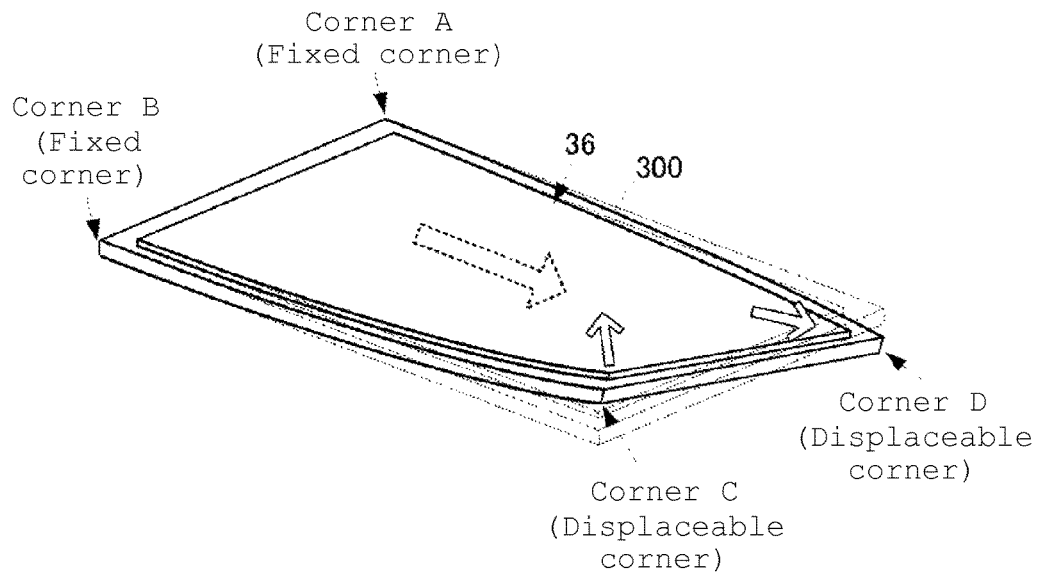
FIG. 16(B) is a view illustrating a schematic perspective shape of the displacement sensor 10C in the state in which a predetermined twisting displacement is generated.

FIG. 16(A) is a view illustrating a schematic perspective shape of the displacement sensor 10C, and FIG. 16(B) is a view illustrating a schematic perspective shape of the displacement sensor 10C in the state in which a predetermined twisting displacement is generated. In FIGS. 16(A) and 16(B), only the second piezoelectric element 36 is arranged for convenience.

As illustrated in FIG. 16(A), for the twisting displacement of 0, namely, in the case that a force generating the twist is not externally applied to the chassis 50 (displacement sensor 10C), the principal surfaces of the elastic body 300 are flat. In this case, the second piezoelectric element 36 neither extends nor contracts, and the voltage is not generated between the electrodes on the surfaces of the second piezoelectric element 36. For the twisting displacement of a predetermined value, namely, in the case that the force generating the twist is externally applied to the elastic body 300, corners C and D diagonal from fixed corners A and B separate from each other by a certain distance in a normal direction compared with the flat state of the elastic body 300 as illustrated in FIG. 16(B). At this point, the corners C and D move in reverse directions based on the principal surface.

In this case, the second piezoelectric element 36 extends at an angle of +45° with respect to the uniaxially-stretching direction in the corner D and the neighborhood of the corner D, and the second piezoelectric element 36 contracts at an angle of −45° with respect to the uniaxially-stretching direction in the corner C and the neighborhood of the corner C. Accordingly, because the contraction or extension (see thick solid-line arrows in FIG. 16(B)) is generated along the directions of −45° and +45° with respect to the uniaxially-stretching direction of the piezoelectric sheet 360 constituting the second piezoelectric element 36, the voltage is generated between the electrodes 361 and 362 constituting the second piezoelectric element 36 according to the contraction or the extension. The displacement sensor 10C can detect the twisting operation and the twist amount of the twisting operation by detecting the voltage.

In the configuration, the corners C and D are equally displaced in the reverse directions, the voltage generated according to the bending operation in FIGS. 15(A) and 15(B) is canceled out, but the deformation detection signal $D_{st}$ is not output by the bending operation. On the other hand, the piezoelectric sheet 350 of the first piezoelectric element 35 is formed such that the uniaxially-stretching direction and the longitudinal direction of the piezoelectric sheet 350 form the angle of 45°. Therefore, the deformation detection signal $D_{sb}$ is not output by the twisting operation. Accordingly, the displacement sensor 10C can individually detect the bending operation and the twisting operation with high accuracy.

The controller 20 converts the deformation detection signal $D_{sb}$ corresponding to the bending operation and the deformation detection signal $D_{st}$ corresponding to the twisting operation, which are input from the displacement sensor 10C, individually into the position detection signals $D_{sd}$, and outputs the position detection signals $D_{sd}$ to the processor 22. For example, the controller 20 converts the deformation detection signal $D_{sb}$ of the bending operation into the position detection signal $D_{sd}$ of the touch operation, and outputs the position detection signal $D_{sd}$. For example, when the processor 22 executes the application software that implements shooting of the image in receiving the touch operation, the user can issue the image shooting instruction by the bending operation. In this case, it is not necessary to add the special driver onto the side of the host device 47, but the image shooting instruction can be received by the bending operation.

For example, in the case that the processor 22 executes the application software that changes the image on the display 30 when receiving the swipe operation in which the user transversely moves the finger while performing the touch operation, the controller 20 converts the deformation detection signal $D_{st}$ of the twisting operation into the position detection signal $D_{sd}$ of the swipe operation, and outputs the position detection signal $D_{sd}$. Therefore, the user can issue the image changing instruction by the twisting operation. In this case, it is not necessary to add the special driver onto the side of the host device 47, but the image changing instruction can be received by the twisting operation. For example, in the case that the image is changed in the device such as the tablet PC in which the chassis is held by both hands, it is necessary to temporarily disengage one of both the hands from the chassis to perform the swipe operation with the finger. In contrast, when the touch type input device of the present invention is applied, the user can perform the twisting operation while holding the chassis by both the hands, which allows the user to perform the image changing processing without adding the special driver onto the device.

DESCRIPTION OF REFERENCE SYMBOLS 1 display device
11D electrostatic capacitance sensor
11P pressure sensor
20 controller
22 processor
23 program storage
30 display
40 panel
45 touch type input device
47 host device
50 chassis
52 control circuit module

The invention claimed is:

1. A touch type input device comprising:
an operation surface;
a touch sensor configured to detect a single touch position corresponding to a location where a user has used a single finger to input a touch operation on the operation surface and to output a position detection signal indicating the single touch position;
a deformation detection sensor configured to detect a level of a deformation operation at the single touch position on the operation surface and to output a deformation level detection signal which varies over time as a function of the level of the deformation operation; and
a controller configured to output a position signal as a function of the position detection and deformation level detection signals, the position signal corresponding to:
  (a) the single touch position when the deformation level detection signal is less than a threshold value; and
  (b) two or more spaced locations on the operation surface when the level detection signal is greater than the threshold value, the spaced locations varying over time, one of the two or more spaced locations corresponding to the single touch position, the other of the spaced locations corresponding to virtual touch positions.

2. The touch type input device of claim 1, wherein the pair of position signals correspond two or more spaced locations correspond to a pinch operation and the spaced locations move relative to one another over time.

3. The touch type input device of claim 2, wherein the touch position moves over time and the controller determines whether the pinch operation is a pinch-in or a pinch-out operation as a function of movement of the touch position.

4. The touch type input device of claim 3, wherein the touch position moves over time and the controller determines that the pinch operation is a pinch-in operation when the location of the touch position moves in a first direction and determines that the pinch operation is a pinch-out operation when the location of the touch position moves in a second direction.

5. The touch type input device of claim 2, wherein the controller determines whether the pinch operation is a pinch-in or a pinch-out operation as a function of the number of times a touch operation takes place within a predetermined time period.

6. The touch type input device of claim 1, wherein a distance between the spaced locations varies as a function of the level of the deformation level detection signal.

7. The touch type input device of claim 1, wherein the deformation operation is one of a pressing operation, a bending operation or a twisting operation.

8. The touch type input device of claim 1, wherein the level of the deformation sensor detects deformation of a side surface of the touch type input device.

9. The touch type input device of claim 1, wherein the deformation sensor detects the level of the deformation of a rear surface of the touch type input device.

10. The touch type input device of claim 1, wherein the deformation operation is detected at the location of the touch operation.

11. The touch type input device of claim 10, wherein the spaced locations on the operation surface are a function of the location of the deformation operation on the operation surface.

12. The touch type input device of claim 1, wherein the deformation detection sensor comprises a piezoelectric film made of a chiral polymer.

13. The touch type input device of claim 12, wherein the chiral polymer is composed of polylactic acid.

14. A method for detecting a touch operation on an operation surface of an input device, the method comprising:
detecting a single touch position corresponding to a location where a user has used a single finger to input a touch operation on the operation surface and outputting a position detection signal indicating the single touch position;
detecting a level of a deformation operation at the single touch position on the operation surface and outputting a deformation level detection signal which varies as a function of the level of the deformation operation; and
outputting a position signal as a function of the position detection and deformation level detection signals, the position signal:
  (a) the single touch position when a level of the deformation level detection signal is less than a threshold value; and
  (b) two or more spaced locations on the operation surface when the level of the deformation level detection signal is greater than the threshold value, the spaced locations varying over time, one of the two or more spaced locations corresponding to the single touch position, the other of the spaced locations corresponding to virtual touch positions.

15. The method of claim 14, wherein the two or more spaced locations correspond to a pinch.

16. The method of claim 15, wherein the touch position moves over time and it is determined that (a) the pinch operation is a pinch-in operation when the touch position moves in a first direction and (b) the pinch operation is a pinch-out operation when the touch position moves in a second direction.

17. The method of claim 15, further comprising determining whether the pinch operation is a pinch-in or a pinch-out operation as a function of movement of the touch position over time.

18. The method of claim 14, further comprising determining whether the pinch operation is a pinch-in or a pinch-out operation as a function of the number of times a touch operation takes place within a predetermined time period.

19. The method of claim 14, wherein a distance between the spaced locations vary as a function of the level of the deformation level detection signal.

20. The method of claim 14, wherein the deformation operation is one of a pressing operation, a bending operation or a twisting operation.

21. The method of claim 14, wherein the deformation operation takes place on the operation surface.

22. The method of claim 14, wherein the deformation operation takes place on a side surface of the input device.

23. The method of claim 14, wherein the deformation operation takes place on a rear surface of the touch input device.

24. The method of claim 14, wherein the deformation operation takes place on the operation surface at a location corresponding to the touch operation.

25. The method of claim 24, wherein the spaced locations on the operation surface are a function of the location of the deformation operation on the operation surface.

* * * * *